UNITED STATES PATENT OFFICE.

THOMAS A. EDISON, OF LLEWELLYN PARK, ORANGE, NEW JERSEY.

METHOD OF TREATING CANS OF ALKALINE STORAGE BATTERIES.

948,542.               Specification of Letters Patent.       Patented Feb. 8, 1910.

No Drawing.       Application filed September 29, 1904.   Serial No. 226,488.

*To all whom it may concern:*

Be it known that I, THOMAS A. EDISON, a citizen of the United States, residing and having my post-office address at Llewellyn Park, Orange, county of Essex, and State of New Jersey, have invented a certain new and useful Method of Treating Cans of Alkaline Storage Batteries, of which the following is a description.

In my improved iron-nickel battery with alkaline electrolyte, gasing occurs which tends to carry off the solution, but provision is made for the separation of the mechanically entrained globules. It is impossible, however, to entirely separate these globules and consequently an accumulation of the electrolyte takes place on the outside of the can, out of which salts of sodium or potassium crystallize. The presence of these crystals is objectionable as they detract from the neat appearance of the battery.

The object of my invention is to prevent the crystallization of the alkaline salt out of any accumulation of the electrolyte which may form on the outside of storage battery cells.

To this end, the invention consists in applying a film or coating of a non-saponifiable oil, such as a mineral hydro-carbon to the exterior of the can, whereby any alkaline solution depositing on the same will flow off beneath the surface of the film, and hence be protected from evaporation so as to thereby prevent crystallization of the salt. Preferably, the process is carried out by rubbing the exterior of the can or receptacle with vaseline, which is then wiped lightly with a cloth to leave a microscopic film. The presence of such an oily film does not in any way affect the appearance or operation of the battery, and in addition to preventing the crystallization of the alkaline metal out of the solution, it acts to protect the vessel from atmospheric oxidation, and also to augment the electrical insulation of the several cells. This film may be renewed from time to time when necessary.

Having now described my invention, what I claim as new therein and desire to secure by Letters Patent is as follows:

1. The process of treating the cans or receptacles of alkaline storage batteries, which consists in applying a microscopic film of non-saponifiable oil to the exterior thereof for the prevention of the formation of crystals of the alkaline salt on the exterior of the receptacles, substantially as set forth.

2. The process of treating the cans or receptacles of alkaline storage batteries for the prevention of crystallization of alkaline salt on the exterior of the receptacles, which consists in applying a non-saponifiable oil to the exterior thereof and then wiping the same lightly with a cloth, to leave only a microscopic film of the oil on the exterior of the receptacle, substantially as set forth.

This specification signed and witnessed this 28th day of Sept. 1904.

THOS. A. EDISON.

Witnesses:
    FRANK L. DYER,
    MINA C. MACARTHUR.